United States Patent [19]
Felsvang et al.

[11] Patent Number: 5,435,980
[45] Date of Patent: Jul. 25, 1995

[54] METHOD OF IMPROVING THE HG-REMOVING CAPABILITY OF A FLUE GAS CLEANING PROCESS

[75] Inventors: Karsten S. Felsvang, Columbia, Md.; Kirsten K. Nielsen, Holte, Denmark; Ove B. Christiansen, Ellicott City, Md.

[73] Assignee: Niro A/S, Soborg, Denmark

[21] Appl. No.: 787,433

[22] Filed: Nov. 4, 1991

[51] Int. Cl.⁶ .............................................. C01G 13/04
[52] U.S. Cl. .................................. 423/210; 423/463; 423/239.1; 423/240 S; 423/244.08
[58] Field of Search ...................... 423/210, 463, 239.1, 423/240 S, 244.08

[56] References Cited

U.S. PATENT DOCUMENTS

| | | | |
|---|---|---|---|
| 3,838,190 | 9/1974 | Birke et al. | 423/210 |
| 3,849,267 | 11/1974 | Hilgen et al. | 204/99 |
| 4,196,173 | 4/1980 | deJong et al. | 423/210 |
| 4,274,842 | 6/1981 | Lindau | 55/72 |
| 4,729,882 | 3/1988 | Ide et al. | 423/210 |
| 4,889,698 | 12/1989 | Moller et al. | 423/210 |
| 5,120,515 | 6/1992 | Audeh et al. | 423/210 |
| 5,130,108 | 7/1992 | Audeh et al. | 423/210 |
| 5,141,724 | 8/1992 | Audeh et al. | 423/210 |

FOREIGN PATENT DOCUMENTS 0254697 1/1988 European Pat. Off. .

OTHER PUBLICATIONS

Chemical Abstract No. 92:168288y, vol. 92, p. 283, 1980 May 19.
Hall et al.; *Water, Air and Soil Pollution*, "Chemical Reactions of Mercury in Combustion Flue Gases", vol. 56, pp. 3-14 (1991), Apr.
P. Schager, *Statens Energiverk*, "The Behaviour of Mercury In Flue Gases", 1991.

Primary Examiner—Wayne Langel
Assistant Examiner—Timothy C. Vanoy
Attorney, Agent, or Firm—Armstrong, Westerman, Hattori, McLeland & Naughton

[57] ABSTRACT

A method is disclosed of improving the Hg removing capability of flue gas purification processes for coal-fired power plant flue gases using spray drying absorption systems. By adjusting the chloride content of the flue gas or the absorbent a permanent high Hg removal is achieved.

20 Claims, 1 Drawing Sheet

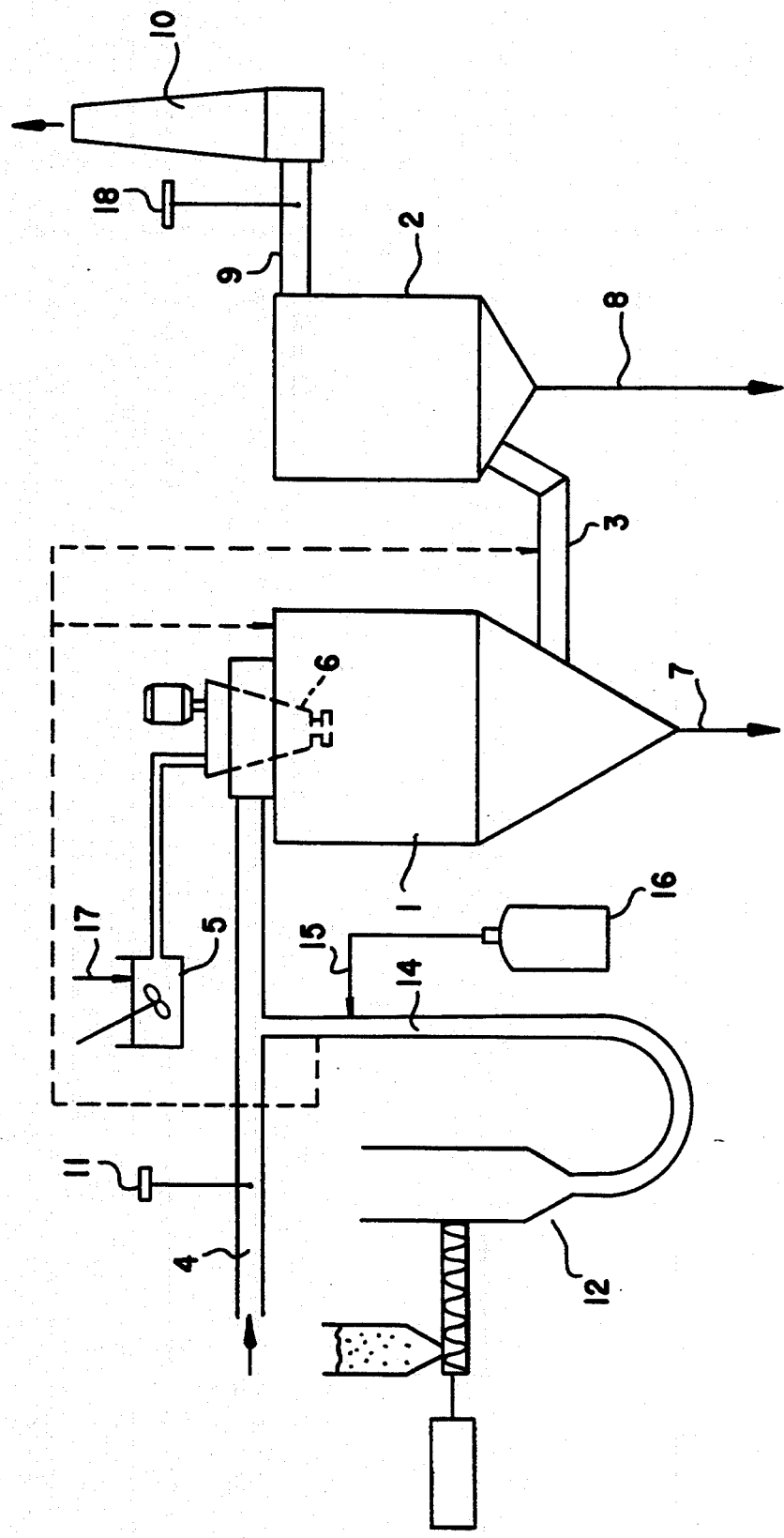

METHOD OF IMPROVING THE HG-REMOVING CAPABILITY OF A FLUE GAS CLEANING PROCESS

FIELD OF THE INVENTION

The present invention relates in general to flue gas purification and more specific to the removal of noxious mercury vapor or compounds from flue gases originating from the combustion of coal, especially from flue gases from coal fired power plants.

BACKGROUND OF THE INVENTION AND PRIOR ART

In the field of municipal waste incineration it has within the last decades been realised that the flue gas resulting from the incineration must be purified to reduce the amount of noxious components therein.

Mercury is one of the noxious incinerator flue gas components the amount of which it is regarded as essential to reduce, and several measures have been suggested to this effect.

Thus, U.S. Pat. No. 4,273,747 (Rasmussen) discloses reduction of the mercury content in hot incinerator flue gases by quenching said gases by atomizing an aqueous liquid therein in the presence of fly ash suspended in the gas, which quenching causes a cooling from a temperature of at least 200° C. to a temperature below 160° C. The aqueous liquid may be water or an aqueous solution or suspension of an alkaline compound. This method will obviously not be suitable for flue gas from combustion of coal in power plants since the temperature of said gas is substantially below 200° C., typically between 120° and 160° C. Besides, the chemical composition of the major impurities of incinerator flue gas and power plant flue gas are so different that the mercury sorption will be influenced thereby.

European patent application no. 0013567 (Svenska Fläktfabriken) also deals with a process for reducing the mercury content of incinerator flue gas in which the gas is contacted with a solid sorbent consisting of powdered calcium hydroxide and of reaction products from the reaction between calcium hydroxide and gaseous hydrogene chloride. The specific conditions for obtainment of an efficient mercury removal are not disclosed but an efficient mercury removal is described in an example in which an incinerator flue gas is treated apparently having hydrogen chloride as the main pollutant.

In European patent no. 0 253 563 a method for removal of mercury and other noxious compounds from incinerator flue gas is disclosed in which an aqueous liquid containing a basic absorbent is atomized into the flue gas to absorb acidic components from the flue gas and simultaneously to evaporate the water in said aqueous liquid, in which process powdery activated carbon is injected into the flue gas and separated again from said gas together with particulate material formed as a result of chemical reactions and drying of the atomized basic absorbent.

A. S. Stepanov et al. in Prom. Sanit. Ochistka Gazov, 1979 (5)10, abstracted in Chemical Abstracts 92:168288y describe removal of mercury from gas by filtering through a layer of granulated activated charcoal modified by HCl.

European patent no. 0 254 697 describes a method for separating mercury from a water vapor containing gas in which the gas is contacted with a washing liquid in two or several stages in which process the gases are cooled to condense the water vapor in the gas and the gas is washed with a washing liquid containing hydrogen chloride and having a pH of about 3 or below to prevent sulphur dioxide to be dissolved in the washing liquid and to ensure that sufficient halide is present to form a complex compound with mercury. The specification of said European patent application teaches that it is essential that the pH of the washing liquid is so low that no substantial amount of $SO_2$ from the gas is dissolved in the washing liquid to form $SO_3^{2-}$ since sulfite would reduce $Hg^{2+}$ to $Hg^0$, which would evaporate and thereby be re-emitted to the waste gas. Thus, the teaching of this European application is that chloride containing washing liquid for mercury removal must be acidic.

Also U.S. Pat. No. 3,838,190 suggests to remove mercury from gases by means of acidic washing liquids. The washing liquids are sulphuric acid of a concentration of at least 50% containing chlorine and/or hydrogene chloride. The process is described as being suitable for gases arising by the combustion or roasting of sulphide containing ores or gases from electrolysis vessels. Obviously, the process is not suitable for flue gases from power plants.

U.S. Pat. No. 4,729,882 deals with a process for removing mercury from gaseous emissions in which a chlorine containing material is added to the gaseous emissions and the mixture is heated to convert the mercury into mercuric chloride which are removed by scrubbing with wash water and fixed as $HgCl_4^{2-}$. The process is described as being suitable for cleaning municipal refuse incinerator emissions. However, when scrubbing of the gas is made by an aqueous solution containing NaCl as Hg binding agent the Hg-removal is substantially below what is achieved by using certain metal complexing agents. The process is a wet scrubbing process thereby having substantial disadvantages when compared with dry or semidry gas purification processes.

Moreover, it should be observed that it is well known to increase the adsorptive effect of activated carbon towards mercury vapor by impregnating the carbon with halogen or inter-halogen compounds as disclosed in U.S. Pat. No. 3,662,523. The process of said U.S. patent, however, involves passing the gas through a fixed bed of impregnated carbon. As described in the above mentioned European patent no. 0,253,563 (incorporated herein by reference) such types of processes are less suited for flue gas treatment.

A discussion of the efficiency of Hg-removal by conventional flue gas purification systems, especially desulfurization methods may be found in a paper by Irene M. Smith: "Trace elements from coal combustion: emissions", IEA Coal Research, London, 1987, pages 54–65. It appears from said paper that in spite of the various systems described above for removing trace elements, especially mercury, from incinerator flue gases, the problem of such removal from coal-fired power plants waste gas still exists.

The flue gas from coal fired power plants differs from the flue gas from municipal incinerator plants in various aspects, especially the pollutants are diluted into a much larger proportion of flue gas; the temperature of said flue gas is lower and the chemical composition of the two types of gases are different.

Thus, the dominating pollutant in incinerator flue gases is often HCl whereas the primary pollutant in gases from coal combustion is $SO_2$.

Whereas the concern as to Hg pollution of the atmosphere has primarily resulted in the development of various systems for Hg-removal from incinerator flue gas it has within the last couple of years been realized that also the Hg-emissions from power plants etc. represent a substantial risk to the environment.

Since flue gas from coal combustion contains so much sulphur dioxide that a desulphurisation process of the flue gas is necessary, a process for reducing the Hg-content of coal combustion flue gas should preferably be compatible with or preferably incorporated into a gas desulphurisation process.

It has, however, turned out that if the processes used or suggested for incinerator flue gas cleaning in connection with or combined with desulphurisation processes, are tranferred or modified to be used on coal combustion flue gas the results are more or less unpredictable and unreliable as far as Hg removal is concerned, as is further illustrated below.

SUMMARY OF THE INVENTION

We have now found that the Hg-removing capability of a flue gas cleaning process for flue gas having a temperature of 110°–170° C., typically 120°–160° C., and resulting from the combustion of coal having a low chloride content, in which process an aqueous suspension of a basic absorbent in a drying chamber of a drying absorption zone comprising a drying chamber and a particle collector as well as a duct connecting them, is atomized to fine droplets into the hot flue gas whereby the water of said droplets evaporates leaving dry fine particles and simultaneously a part of noxious components of the gas, including sulphur oxides, hydrogen halides and nitrogen oxides and mercury, are sorbed by the droplets of the fine particles, whereupon the flue gas with entrained dry fine particles is passed through the particle collector wherein contact between the particles and the flue gas causes a further sorption of noxious components, may be improved by increasing the amount of chloride supplied to the drying-absorption zone.

In the present specification and the attached claims the term "an aqueous suspension of a basic absorbent" is intented to cover also an aqueous solution of a basic absorbent in case the absorbent is highly water soluble, such as sodium carbonate.

In the present specification and the attached claims Hg or the word mercury means said element either as vapor of the metal or as a chemical compound or complex. The term "chloride" is intended to mean chloride ions as such or gaseous hydrogene chloride or compounds which by heating in the presence of coal forms $Cl^-$ or HCl.

The chloride content of flue gases from coal combustion depends on the chloride content of the coal. Since said chloride content of coal mined at different locations varies substantially also the chloride content of the flue gas varies. By increasing the amount of chloride supplied to the drying-absorption zone in accordance with the method of the present invention it is possible with any quality of coal to achieve a high Hg-removing effect of the purification process in which primarily a desulphurisation is performed.

It has been experienced that the increase of the Hg-removing effect of chloride addition to the drying-absorption zone in a process treating flue gases of low chloride content is especially remarkable when activated carbon is present, but even without presence of carbon the effect is significant.

Activated carbon will often be present together with fly ash in the flue gas to be purified due to insufficient combustion, but in a preferred embodiment of the process powdery activated carbon is dispersed into the flue gas at a location upstream of the drying chamber into said chamber or downstream of the chamber but upstream of the particle collector.

The term activated carbon is here used in the broad sense comprising any carbonacious material having sorbing activity and is thus not restricted to cover materials having been subjected to an activating treatment.

The powdery activated carbon is preferably used in an amount of 1–100 mg/$Nm^3$ flue gas. $Nm^3$ means the amount of gas having a volume of 1 $m^3$ at atmospheric pressure and a temperature of 20° C. Introduction of the powdery activated carbon into the process may be performed as described in European patent specification no. 0 253 563, incorporated herein by reference.

By the process according to the present invention various measures may be used for increasing the amount of chloride in the drying-absorption zone. Thus, said increase may conveniently be achieved by incorporating an alkaline- or alkaline earth metal salt or a solution thereof in the aqueous suspension of basic absorbent. This may be achieved by substituting sea water partially or completely for water of low chloride content otherwise used for preparing the aqueous suspension of basic absorbent.

Such an increase of the chloride content of the absorbent suspension may further result in an increased desulphurisation efficiency of the process when lime or limestone is used as absorbent as explained in the co-pending U.S. patent application Ser. No. 552 645 filed Jul. 16, 1990, incorporated herein by reference.

As supplement to or as alternative to incorporating chloride in the aqueous suspension of basic absorbent, the increase of chloride in the drying-absorption zone may be achieved by increasing the chloride concentration of the flue gas by supplying a chloride or chlorine containing material to the coal before or during the combustion thereof and/or by injecting gaseous HCl into the flue gas upstream of or in the drying-absorption zone. When HCl is injected into the drying-absorption zone this may take place in the drying chamber or in the duct between the said chamber and the particle collector.

Since most chloride or chlorine containing compounds will release gaseous chlorides when introduced into the combustion zone of a coal fired boiler several materials come into consideration for increasing the chloride content of the flue gas, however, for economic and operational reasons it is preferred to use sodium or calcium chloride or chlorine containing waste plastic for said purpose.

When the process according to the invention is performed by increasing the chloride content of flue gas, the total chloride content of the flue gas, calculated as $Cl^-$ is increased to at the most 150 ppm on weight basis.

A positive effect of the increase may, however, be obtained at total chloride concentrations substantially lower dependent on operational conditions, equipment, presence of carbon in the flue gas etc. and a positive effect of chloride additions as low as 1 ppm is expected, especially when a simultaneous injection of activated carbon is made. The preferred total chloride concentration is 20–120 ppm, calculated as $Cl^-$.

When the increase of chloride in the drying-absorption zone is obtained by adding chloride to the absorbent suspension such chloride is usually added in an amount to obtain a chloride concentration in aqueous suspension between 0.1 and 8 percent by weight based on dry solids.

BRIEF DESCRIPTION OF THE DRAWING

DETAILED DESCRIPTION OF THE INVENTION

Preferred embodiments of the invention is further described below with reference to the drawing depicting a layout suitable for performing certain of said preferred embodiments.

The main elements shown on the Drawing are the drying chamber 1 and the particle collector 2 mutually connected by a duct 3. These three elements together constitute what in the present specification and in the attached claims is termed the drying-absorption zone.

A stream of flue gas from the preheater of a coal-fired boiler (not shown) is introduced into the drying chamber 1 via a duct 4, optionally after having passed a dust collector (not shown).

An aqueous absorbent suspension is prepared in a mixing vessel 5 and by means of an atomizer wheel 6 atomized into the chamber 1. This absorbent suspension may be prepared for instance from slaked lime and recycled materials as described in U.S. Pat. No. 4,279,873, incorporated herein by reference.

By contact with the hot flue gases in the chamber the water evaporates from the atomized suspension whereby the temperature of the gas decreases substantially and at the same time acidic substances, mainly $SO_2$, in the flue gas react with the basic absorbent producing a particulate material primarily comprising salts formed by said reaction, together with non-reacted absorbent.

A part of this particulate material and of possible fly ash are recovered from the bottom of the spray absorption chamber through 7, whereas the remaining part of the particulate material is carried, entrained in the gas, through duct 3 into the particle collector 2.

The particle collector 2 may be a baghouse or an electrostatic precipitator in which substantially all particulate material is removed from the gas and recovered through 8.

From the particle collector 2 the thus cleaned gas may be conducted through a duct 9 to a stack 10 for release into the atmosphere.

The particulate material recovered through 7 and 8 may be partially recycled for preparing the absorbent suspension in the vessel 5 as explained above.

The process as described so far serves primarily to remove acidic components which in power plant flue gas essentially are sulphur oxides. However, also a certain part of Hg present in the flue gas will be removed together with the particulate material recovered through 7 and 8.

It has, however, turned out that the amount of Hg removed together with particulate material is far less than desired if the chloride content of the gas is low.

Therefore, a device 11 for measuring the chloride concentration in the flue gas may be inserted in the duct 4, or alternatively the chloride concentration in the flue gas is calculated or estimated on basis of the chloride contents of the coal used in the boiler.

If the chloride content is found to be below a certain value as defined above and in the attached claims arrangements are taken according to the invention for increasing the gas chloride content. This may be done in connection with an introduction of activated carbon which in itself also has a Hg removing effect and together with chloride addition exihibts a synergistic effect enabling an extremely efficient Hg removal.

In the embodiment shown, an apparatus 12 for dosing and injecting activated carbon is connected to the flue gas duct 4 through a conduit 14.

Before debouching into duct 4 the conduit 14 receives hydrogen chloride through conduit 15 connected to a HCl source 16.

Thus, hydrogen chloride and activated carbon are together introduced into the flue gas and, admixed with the latter, introduced into the spray drying absorption zone in 1, 3 and 2 thereby substantially increasing the Hg sorption taking place in this zone.

As indicated by means of the dotted lines the mixture of activated carbon and hydrogen chloride may be introduced directly into the drying chamber 1 or into the duct 3 as alternative to or as supplement to the introduction into the duct 4.

As explained above the chloride introduction may alternatively be performed separately from the introduction of activated carbon or it may be performed without using activated carbon. Especially, if the gas introduced through 4 contains carbon resulting from an incomplete combustion in the boiler.

As a further alternative to the above described embodiments or as a supplement thereto a chloride salt may be added to the absorbent suspension in the vessel 5 as indicated by 17 to obtain a mercury absorption improving increase of the chloride contents in the droplets of absorbent suspension atomized by the atomizer 6.

The amount of chloride introduced through 15 or 17 as well as the amount of activated carbon possibly dosed by means of 12 may be adjusted also on basis of the Hg content of the treated gas measured by means of a device 18 arranged in the duct 9.

The invention is further illustrated by means of the following examples and comparison examples.

COMPARISON EXAMPLE 1

In a dry flue gas desulphurization system as the one illustrated on the drawing in which the particle collector 2 was a baghouse having fabric filter flue gas from a coal fired boiler was desulphurized. The plant was operated at full load corresponding to approx. $1.2 \times 10^6$ $Nm^3/h$.

The amount of fly ash introduced through conduit 4 was approx. 10 $g/Nm^3$ and the flue gas temperature in 4 was 313° F. (156° C.) and the baghouse outlet temperature in duct 9 was 199° F. (93° C.).

Mercury was measured in and out of the system which means in duct 4 and in duct 9. No chloride was present in the flue gas or in the absorbent suspension prepared in vessel 5 and no chloride or activated carbon was added through conduit 14.

The following results were achieved:

| Inlet µgHg/Nm³ at 5% O₂ | Outlet µgHg/Nm³ at 5% O₂ | % Removal |
| --- | --- | --- |
| 7.4 | 6.5 | 12 |
| 9.2 | 8.6 | 7 |
| 8.7 | 8.6 | 1 |

As it appears only approx. 7% average Hg removal was achieved in this process.

COMPARISON EXAMPLE 2

A flue gas desulphurization system as shown on the drawing wherein the particle collector 2 was an electrostatic precipitator was used to desulphurize flue gas from a coal fired boiler. The plant was operating at full load corresponding to approx. $1.8 \times 10^6$ Nm³/h.

The fly ash introduced together with the flue gas was in the order of 10 g/Nm³.

Flue gas inlet temperature in duct 4 was 305° F. (152° C.) and the electrostatic precipitator outlet temperature in duct 9 was 160° F. (87° C.).

No chloride was present in the flue gas or in the absorption suspension prepared in vessel 5.

Mercury was measured in an out of the system and the following results achieved:

| Inlet µgHg/Nm³ at 5% O₂ | Outlet µgHg/Nm³ at 5% O₂ | % Removal |
| --- | --- | --- |
| 5.6 | 4.7 | 16 |
| 3.8 | 2.4 | 37 |
| 3.8 | 2.8 | 26 |
| 3.9 | 3.3 | 15 |

An average mercury removal of 24% was obtained with this system.

COMPARISON EXAMPLE 3

A flue gas desulphurization system of the type shown on the drawing in which the particle collector was a bag house was used to desulphurize flue gas from a coal fired boiler.

The plant was operated at full load corresponding to approx. $2.2 \times 10^6$ Nm³/h.

Fly ash in the gas to be treated was in the order of 10 g/Nm³.

The flue gas inlet temperature in duct 4 was 306° F. (152° C.) and baghouse outlet temperature 175° F. (79° C.).

No chloride was present in the flue gas or in the absorption suspension.

Mercury was measured in the gas at the inlet and the outlet of the system and the following results were achieved:

| Inlet µgHg/Nm³ at 5% O₂ | Outlet µgHg/Nm³ at 5% O₂ | % Removal |
| --- | --- | --- |
| 11 | 8.9 | 19 |
| 11 | 9.1 | 17 |
| 9.9 | 9.2 | 7 |
| 11 | 9.3 | 15 |

An average of 15% Hg removal was obtained with this system.

EXAMPLE 1

This Example was performed as Comparison Example 2 above apart from the fact that calcium chloride was added to the absorbent suspension produced in vessel 5. The calcium chloride was added in an amount corresponding to 2.5 percent by weight Cl in the absorbent suspension, based on dry solids.

Mercury was measured in an out of the system and the following results were obtained:

| Inlet µgHg/Nm³ at 5% O₂ | Outlet µgHg/Nm³ at 5% O₂ | % Removal |
| --- | --- | --- |
| 3.9 | 0.80 | 80 |
| 3.7 | 0.95 | 74 |

An average mercury removal of 77% was obtained with this system, which means a substantial improvement over the Hg absorption experienced in Comparison Example 2.

EXAMPLE 2

A dry flue gas desulphurization system as the one depicted on the drawing but suplemented with an electrostatic precipitator upstream of duct 4 for fly ash collection, and in which the particle collector 2 was a baghouse was used desulphurize flue gas from a coal fired boiler.

The plant was operated at full load corresponding to $1.2 \times 10^6$ Nm³/h.

The fly ash in the flue gas introduced through duct 4 was in the order of 50 mg/Nm³. The temperature of the gas in duct 4 was 275° F. (135° C.) and baghouse outlet temperature 158° F. (70° C.).

HCl concentration in the flue gas introduced through duct 4 was 90 mg/Nm³.

Mercury was measured in an out of the system and the following results were achieved:

| Inlet µgHg/Nm³ at 5% O₂ | Outlet µgHg/Nm³ at 5% O₂ | % Removal |
| --- | --- | --- |
| 2.9 | 1.3 | 56 |

EXAMPLE 3

A dry flue gas desulphurization system as shown on the drawing was used. As in Example 2 the system was supplemented with an electrostatic precipitator for fly ash collection upstream of duct 4. The particle collector 2 was an electrostatic precipitator.

The plant was used to desulphurize flue gas from a coal fired boiler. The plant was operated at full load corresponding to approx. $1.1 \times 10^6$ Nm³/h. The amount of fly ash introduced by the flue gas through duct 4 was in the order of 1.2 g/Nm³. Gas temperature in duct 4 was 257° F. (125° C.) and the outlet temperature in duct 9 was 158° F. (70° C.).

HCl concentration in the flue gas was approx. 65 mg/Nm³.

Mercury was measured in an out of the system and the following results obtained:

| Inlet µgHg/Nm³ at 5% O₂ | Outlet µgHg/Nm³ at 5% O₂ | % Removal |
|---|---|---|
| 2.74 | 0.32 | 88 |
| 2.61 | 0.29 | 89 |

EXAMPLE 4

A dry flue gas desulphurization system consisting of a plant as the one shown on the drawing wherein the particle collector 2 is a baghouse, was used to treat flue gas from a coal fired boiler.

The plant was operated at full load corresponding to 0.11×10⁶ Nm³/h and fly ash in the flue gas in duct 4 was in the order of 10 g/Nm³.

The temperature of the gas in duct 4 was 342° F. (172° C.) and outlet temperature from the baghouse was 175° F. (79° C.).

HCl concentration in the flue gas was 142 mg/Nm³. Mercury was measured in and out of the system. The following results were achieved:

| Inlet µgHg/Nm³ at 5% O₂ | Outlet µgHg/Nm³ at 5% O₂ | % Removal |
|---|---|---|
| 5.4 | 0.14 | 97 |
| 5.2 | 0.18 | 97 |
| 5.0 | 0.20 | 96 |
| 4.7 | 0.18 | 96 |

Average removal with this system is 96%.

The above process was modified by adding activated carbon through conduit 14 to the stream of flue gas in duct 4 upstream of the drying chamber. Mercury was measured in and out of the system.

The following results were achieved:

| Amount of carbon mg/Nm³ | Inlet µgHg/Nm³ at 5% O₂ | Outlet µgHg/Nm³ at 5% O₂ | % Removal |
|---|---|---|---|
| 8 | 4.0 | 0.10 | 98 |
| 8 | 4.4 | <0.01 | >99.8 |
| 36 | 6.2 | 0.01 | 99.8 |
| 36 | 5.6 | <0.01 | >99.7 |

Average removal with addition of activated carbon was thus better than 99%.

We claim:

1. In a flue gas cleaning process for elemental Hg vapor containing flue gas having a temperature of 110°–170° C. and resulting from the combustion of coal having a chloride content insufficient to convert the elemental Hg vapor into HgCl₂, in which process an aqueous suspension of a basic absorbent in a drying chamber of a drying-absorption zone comprising a dryer chamber and a particle collector as well as a duct connecting them, is atomized to fine droplets into the hot flue gas, evaporating the water of said droplets to form dry fine basic absorbent particles and in which a part of noxious components of the gas including sulphur oxides, hydrogen halides and nitrogen oxides and mercury, is simultaneously sorbed by the basic absorbent particles, whereupon the flue gas with entrained dry fine basic absorbent particles is passed to the particle collector wherein contact between the particles and the flue gas causes a further sorption of noxious compounds, wherein the improvement comprises: the step of increasing the amount of chloride supplied to the drying-absorption zone to a quantity sufficient to convert elemental Hg to HgCl₂ to improve the Hg sequestering effect of the droplets.

2. The method of claim 1, wherein powdery activated carbon is dispersed into the flue gas at a location upstream of the particle collector.

3. The method of claim 1, wherein the increase of the amount of chloride in the drying absorption zone is accomplished by incorporating an alkaline metal or alkaline earth metal salt or a solution thereof in the aqueous suspension of basic absorbent.

4. The method of claim 1, wherein the increase of the amount of chloride in the drying-absorption zone is accomplished by increasing the chloride concentration in the flue gas by one or both of the following measures (a) adding a chloride or chlorine containing material to the coal before or during the combustion thereof, and (b) injecting gaseous HCl into the flue gas upstream of or into the drying-absorption zone.

5. The method of claim 2, wherein the activated carbon is used in an amount of 1–100 mg/Nm³ flue gas.

6. The process of claim 2, wherein 90–99% of the Hg content of the flue gas is removed by increasing the chloride content of the gas supplied to the drying-absorption zone to 20–150 ppm and by dispersing activated carbon into the flue gas in an amount of 1–100 mg/Nm³.

7. The method of claim 1, including the steps of determining the Hg content of the flue gas leaving the particle collector and increasing the amount of chloride supplied to the drying-absorption zone in response to an increase in the Hg content determined in the flue gas leaving the particle collector.

8. The method of claim 1, including the steps of determining the chloride content of the flue gas entering the drying-absorption zone and adjusting the amount of chloride supplied to the drying-absorption zone in response to an increase or decrease of the chloride content in the flue gas entering the drying-absorption zone.

9. The method of claim 8, wherein said chloride content is established by gas analysis and/or by calculations based on chloride analysis of the coal.

10. In a process of removing noxious components including sulphur dioxide and mercury from hot flue gases originating from the combustion of coal, the chloride content of said coal being such that normal combustion thereof in a boiler forms a flue gas having a chloride content, calculated as Cl⁻, less than 150 ppm by weight, in which process an aqueous basic absorbent suspension having a chloride content, calculated as Cl⁻, less than 0.1 percent by weight based on dry solids, is atomized to fine droplets which are contacted with the hot flue gas in the drying chamber of a drying-absorption zone comprising a drying chamber and a particle collector and a duct connecting them, the water of said droplets evaporating leaving dry fine particles, and a part of the noxious components of the gas is simultaneously sorbed by the droplets and the fine particles, whereupon the flue gas with entrained dry fine particles is passed to the particle collector wherein contact between the particles and the flue gas causes a further sorption of noxious compounds, the improvement of increasing the amount of chloride in the drying-absorption zone to a mercury absorption improving quantity by increasing the chloride content of the flue gas before it reaches said zone or by adding sodium chloride or calcium chloride to the aqueous suspension or by applying both these measures.

11. The process of claim 10, wherein powdery activated carbon is dispersed into the flue gas at a location upstream of the particle collector.

12. The process of claim 10, wherein gaseous hydrogen chloride is added to the flue gas upstream of or into the drying-absorption zone to obtain a total chloride concentration in the flue gas of at least 1 ppm per weight.

13. The process of claim 10, wherein the step of increasing the chloride content of the flue gas is performed by adding a chloride or chlorine containing material to the coal before or during combustion thereof in an amount sufficient to obtain a total chloride concentration in the flue gas of at least 1 ppm by weight.

14. The process of claims 12 or 13 wherein a total chloride concentration in the flue gas of 20–120 ppm is obtained.

15. The process of claim 10, wherein activated carbon and gaseous HCl are injected together upstream of or into the drying-absorption zone.

16. The process of claim 10, wherein the desired increase of the amount of chloride in the drying-absorption zone is provided by adding sodium or calcium chloride to the absorbent suspension.

17. A process for removing noxious components including sulphur dioxide and elementary Hg vapor from a hot flue gas originating from the combustion of coal having a chloride content insufficient to convert the elementary Hg vapor into HgCl2 in which process an aqueous suspension of a basic absorbent in a drying chamber of a drying-absorption zone comprising a drying chamber and a particle collector as well as a duct connecting them, is atomized to fine droplets into the hot flue gas, whereby the water of said droplets evaporates leaving dry fine particles and simultaneously a part of the noxious components of the gas including sulphur oxides, hydrogen halides, nitrogen oxides and mercury, are sorbed by the droplets and the fine particles, whereupon the flue gas with entrained dry particles is passed to a particle collector wherein contact between the particles and the flue gas causes a further sorption of noxious components, comprising the steps of:
(a) determining the chloride content of the flue gas upstream of the drying-absorption zone, and
(b) based on the thus determined chloride content, adding a chloride containing material to at least one of the flue gas, the coal and the aqueous suspension to increase the amount of chloride supplied to the drying-absorption zone sufficient to convert the Hg into HgCl2 and thereby improve the Hg removing capability of the process.

18. The process of claim 17, wherein powdery activated carbon is dispersed into the flue gas at a location upstream of the particle separator.

19. The process of claim 17, wherein the chloride content of the flue gas upstream of the drying-absorption zone is established by gas analysis.

20. The process of claim 17, wherein the chloride content of the flue gas upstream of the drying-absorption zone is established by calculation based on the chloride content of the coal.

* * * * *